United States Patent
Neufeld et al.

(10) Patent No.: US 12,174,799 B2
(45) Date of Patent: *Dec. 24, 2024

(54) CLOUD-NATIVE GLOBAL FILE SYSTEM WITH DATA EXPORTER

(71) Applicant: Nasuni Corporation, Boston, MA (US)

(72) Inventors: Russell Andrew Neufeld, Newton Highlands, MA (US); Max Picard Perry, Boston, MA (US); John Adam Carter, Boston, MA (US)

(73) Assignee: Nasuni Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,759

(22) Filed: Jan. 16, 2024

(65) Prior Publication Data

US 2024/0184752 A1 Jun. 6, 2024

Related U.S. Application Data

(63) Continuation of application No. 17/962,587, filed on Oct. 10, 2022, now Pat. No. 11,874,807, and a continuation of application No. 16/910,177, filed on Jun. 24, 2020, now Pat. No. 11,468,018.

(51) Int. Cl.
    *G06F 16/18* (2019.01)
    *H04L 67/1097* (2022.01)
    *H04L 67/53* (2022.01)
    *H04L 67/565* (2022.01)

(52) U.S. Cl.
    CPC ...... *G06F 16/1873* (2019.01); *H04L 67/1097* (2013.01); *H04L 67/53* (2022.05); *H04L 67/565* (2022.05)

(58) Field of Classification Search
    CPC .. H04L 67/1097; H04L 67/20; G06F 16/1873
    See application file for complete search history.

(56) References Cited

U.S. PATENT DOCUMENTS

| | | | |
|---|---|---|---|
| 8,751,515 B1 * | 6/2014 | Xing | G06F 16/113 707/755 |
| 2015/0052111 A1 * | 2/2015 | Mason, Jr. | G06F 11/1448 707/684 |
| 2018/0285353 A1 * | 10/2018 | Ramohalli Gopala Rao | G06F 16/214 |
| 2019/0129798 A1 * | 5/2019 | Mutha | G06F 16/122 |
| 2019/0392150 A1 * | 12/2019 | Shevade | H04L 61/2517 |
| 2020/0201827 A1 * | 6/2020 | Chacko | G06F 9/4451 |

* cited by examiner

*Primary Examiner* — Eddy Cheung
(74) *Attorney, Agent, or Firm* — David H. Judson

(57) ABSTRACT

A cloud-native global file system is augmented to include a file exporter (or, more generally, a file export tool) that facilitates an enterprise customer's use of a cloud-native tool that would otherwise be unable to operate against the global file system's underlying file system representation. In a typical use case, the file exporter is configured to extract in a native object format and to an unencrypted target all or a portion of a volume's data from the underlying file system representation. In this manner, the exporter creates a copy of the data set that the enterprise user can then leverage against the desired cloud-native tool or other cloud services that are not under the management or control of the global file system service provider.

7 Claims, 11 Drawing Sheets

You're ready for launch! 🚀
Review the input options below and click the "Launch Stack" button below to continue.

Region
The AWS region in which the Nasuni Analytics Connector will run.   US East (Ohio)

Source Cloud
The cloud provider which hosts the source Nasuni volume.   Microsoft Azure

Destination Cloud
The cloud provider to which files from the source Nasuni volume will be exported.   aws Amazon Web Services You will be prompted to login to your AWS account if not already logged in.

[Back] [Launch Stack]

FIG. 11

Quick create stack

Template

Template URL
https://s3.us-east-2.amazonaws.com/unifx-stack/unifx.yml

Stack description
CloudFormation template to create all required resources to run the Nasuni Analytics Connector

Stack name
Stack name

*Enter a stack name*

Stack name can include letters (A-Z and a-z), numbers (0-9), and dashes (-).

FIG. 12

Source Information

Source S3 Bucket Name
The S3 bucket that contains the Nasuni Volume from which the Nasuni Analytics Connector will ingest data.

nasunifiler5acdac7c-3a8f-4190-bdf6-8a65574bd74e-2-0

Source S3 Bucket Access Key ID
Access key ID with read privileges to the source bucket. Leave blank to use you account's credentials.

Source S3 Bucket Secret Access Key
Secret access key with read privileges to the source bucket. Leave blank to use your account's credentials.

Nasuni Volume Encryption Key Parameter Name
The name of the Parameter in AWS Parameter Store that contains the Nasuni Volume Encryption Key for the source Nasuni Volume.

/nasunifiler5acdac7c-3a8f-4190-bdf6-8a65574bd74e-2-0/pgp-key

Nasuni Volume Encryption Key Passphrase
The passphrase (if configured) for the Volume Encryption Key

Nasuni Snapshot Handle
The handle representing the start of the snapshot of the source volume from which the Nasuni Analytics Connector will ingest data.

5.uniedFffFe2-1561999406-21557

Source Path
The starting directory within the source Nasuni Volume from which the Nasuni Analytics Connector will ingest data

CLOUD-NATIVE GLOBAL FILE SYSTEM WITH DATA EXPORTER

BACKGROUND OF THE INVENTION

It is known to provide a cloud-native global file system that is used to provide primary file storage for enterprise data. In this approach, edge appliances (or "filers") typically located on-premises securely transmit all files, file versions and metadata to a preferred private or public cloud object store, while locally caching only active files. The appliances are stateless, and multiple appliances can mount the same volume in the cloud. As files are written locally, an authoritative copy of every file and metadata (inodes) are stored in the cloud. The system provides a single, unified namespace for all primary file data that is not bound by local hardware or network performance constraints. The above-described approach to enterprise file services also has been extended to provide multiple-site/multiple-filer access to the same namespace, thereby enabling participating users with the ability to collaborate on documents across multiple filers/sites. Major cloud platforms, e.g., Amazon® AWS, Microsoft® Azure, Google® Cloud and others, are then utilized as a write-once, read many object store for the enterprise primary file data, which is typically stored in volumes. A solution of this type is available commercially from Nasuni® Corporation of Boston, Massachusetts.

While the above-described solution provides significant advantages, many of the cloud platforms that provide the infrastructure for the global file system object store are providing their own cloud-native tools. These include, without limitation, business intelligence tools, analytics tools, machine learning tools (e.g., supporting image/video/text processing), search, and many others. Enterprise customers desire to use these tools against the files that they have stored in the cloud-native global file system, however, the majority of these tools only operate on data sets which live in their native object stores. Enterprise data in the cloud-native global file system is not directly accessible by these services.

SUMMARY OF THE INVENTION

According to this disclosure, the cloud-native global file system is augmented to include a file exporter (or, more generally, a file export tool) that facilitates an enterprise customer's use of a cloud-native tool that would otherwise be unable to operate against the global file system's underlying file system representation. In a typical use case, the file exporter is configured to extract in a native object format and to an unencrypted target (e.g., an S3 bucket, an Azure storage account, and the like) all or a portion of a volume's data from the underlying file system representation. In this manner, the exporter creates a copy of the data set (e.g., a short-lived temporary one) that the enterprise user can then leverage against the desired cloud-native tool or other cloud services that are not under the management or control of the global file system service provider.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the present invention and the advantages thereof, reference is now made to the following descriptions taken in conjunction with the accompanying drawings, in which:

FIGS. 7-16 depict representative user interface (UI) screens by which the exporter of this disclosure is configured, executed and monitored during the export according to a preferred embodiment.

DETAILED DESCRIPTION OF THE INVENTION

Figure 1:
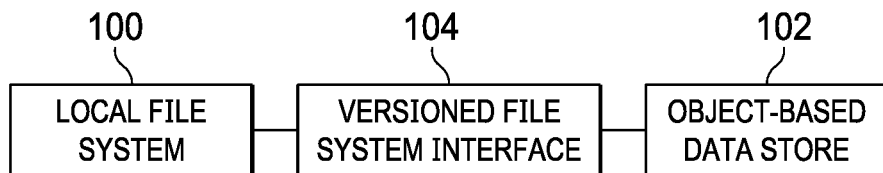
FIG. 1 is a block diagram illustrating how a known versioned file system interfaces a local file system to an object-based data store.

FIG. 1 illustrates a local file system 100 and an object-based data store 102. Although not meant to be limiting, preferably the object-based data store 102 is a "write-once" store and may comprise a "cloud" of one or more storage service providers. An interface 104 (or "filer") provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni® Corporation of Boston, Massachusetts.

Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
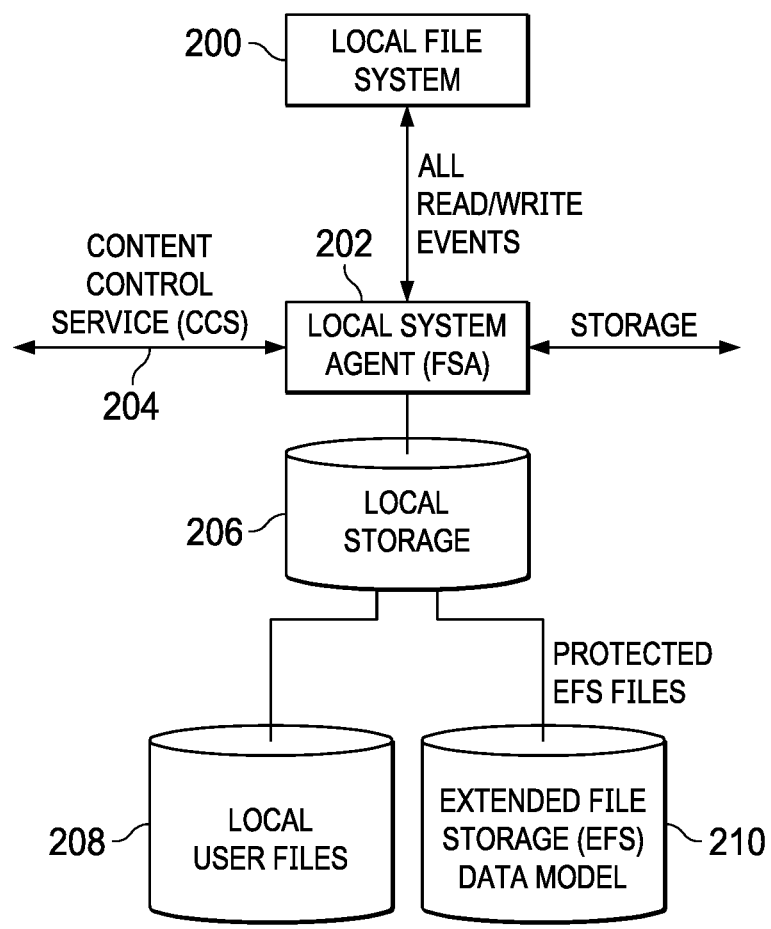
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
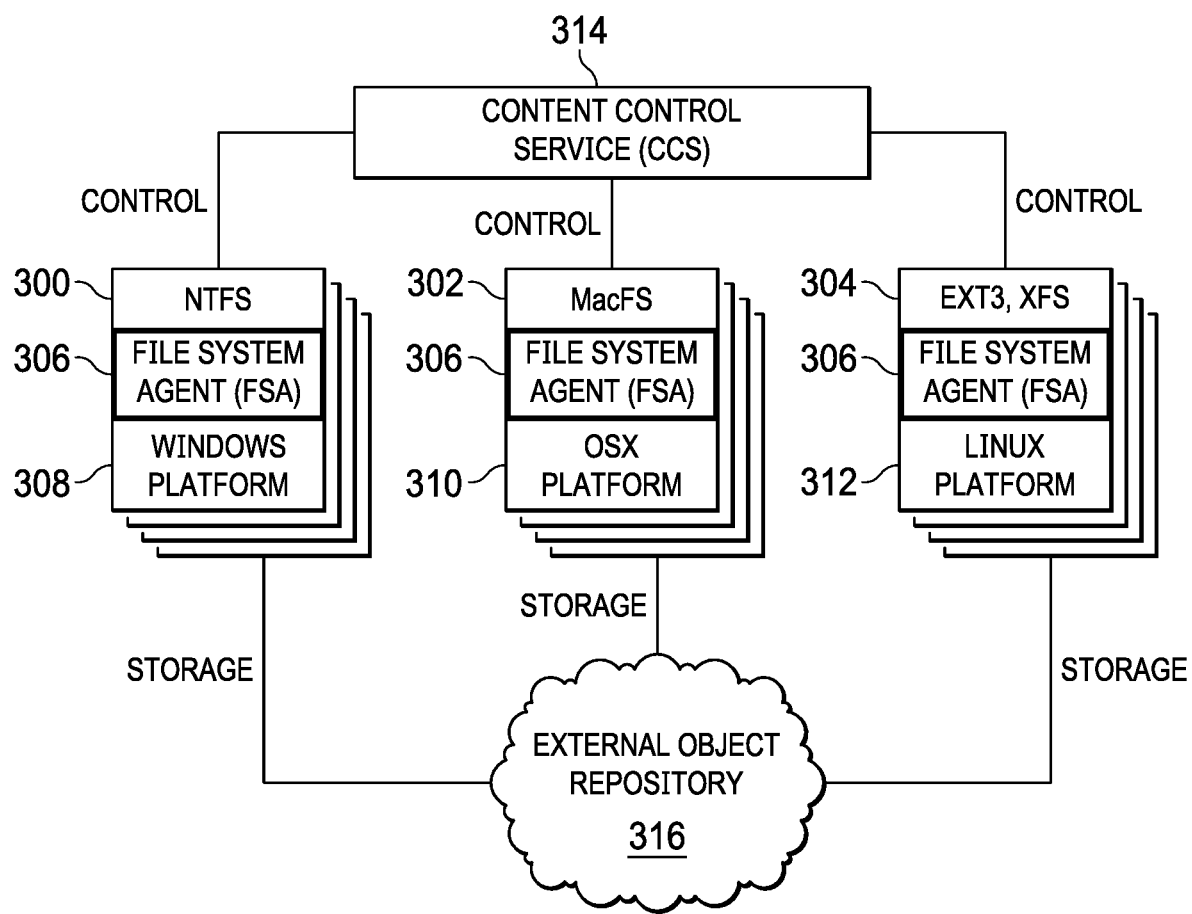
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
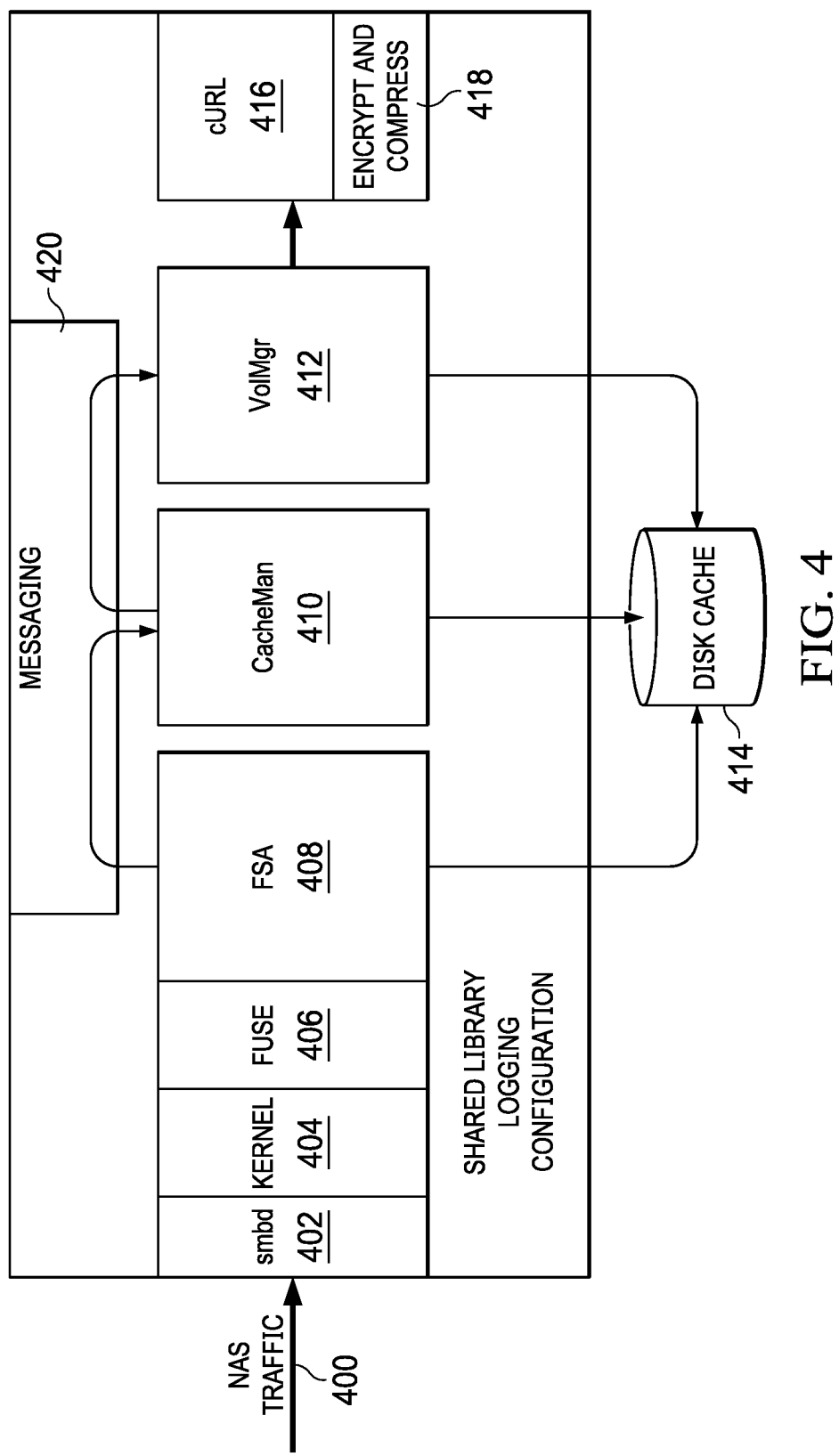
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

For more details concerning the filer as described above, the disclosure of U.S. Pat. No. 9,575,841 is hereby incorporated by reference.

Figure 5:
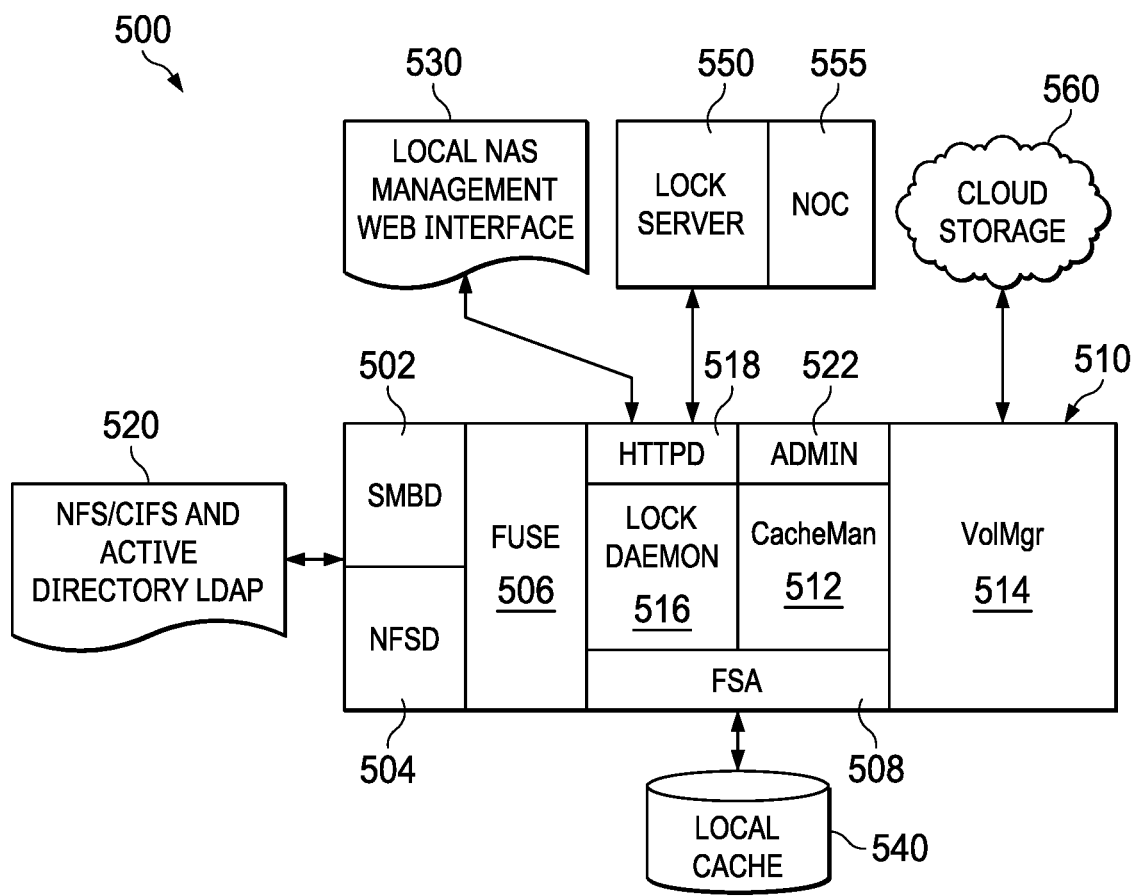
FIG. 5 depicts a versioned file system that implements global locking.

FIG. 5 is a block diagram that illustrates a system 500 for managing a versioned file system (as described above) that also includes the capability of global locking. The system 500 includes an interface 510 in communication with local traffic 520, a web-based portal 530, a local cache 540, a lock server 550, and cloud storage 560. The interface 510 includes a SMBD layer 502, a NFSD layer 504, a FUSE module 506, a FSA 508, a cache manager 512, a volume manager 514, a lock daemon 516, a transport layer 518, and an administrative module 522. In some embodiments, the interface 510 is the same as the interface described with respect to FIG. 4 but with the addition of the lock daemon 516.

SMB/CIFS lock requests are intercepted by SMBD layer 502, which is a SAMBA file server daemon. An optional Virtual File System (VFS) module can extend the SAMBA server daemon to send the local lock information to the FSA 508. FSA 508 then communicates with FUSE 506 to coordinate the FUSE file descriptors (pointers) with the ioctl information to determine a path for the given file(s) associated with the lock request. Assuming a path is enabled for global locking, FSA 508 sends the lock and path to the lock daemon 516, which handles the lock request as described below. If a path is not enabled for global locking, the lock request stays within the SAMBA server as it did previously (e.g., conflict management, etc. as described above) and it is not sent to the lock daemon 516.

NFS lock requests are passed through the NFSD layer 504 to FUSE 506. Assuming a path prefix is enabled for global locking, FSA 508 communicates with the lock daemon 516 to handle the lock request using a common protocol, as described above. If the path prefix is not enabled for global locking, FSA 508 handles the lock request as it did previously (e.g., conflict management, etc. as described above) and the lock request is not sent to the lock daemon 516.

The lock daemon 516 is responsible for local lock management and coordinating with the global lock server. The lock daemon 516 can perform one or more of the following functions: (a) translating the lock format; (b) communicating with the centralized lock server; (c) acquiring locks; (d) lock peeking; (e) lock re-acquiring; (f) lock releasing; and (g) communicating with the filer.

With respect to translating the lock format, the lock daemon 516 can translate the local file lock requests to a common lock format understood by the centralized lock server 550 (described below). Using this approach, the lock server 550 receives a lock request in one format regardless of the underlying network protocol (e.g., SMB/CIFS or NFS). The centralized lock server 550 can be in a network operations center (NOC) 555.

The lock daemon 516 can then communicate with the centralized lock server 550 by making calls to a Centralized Lock API. Through the API, the lock daemon 516 can execute a lock request, an unlock request, and/or a lock break request. A lock request generally requires the transmission of certain information such as the first handle (a unique identifier to the original base object for the file), the requested lock mode, the file path, the protocol of the requester, etc. Additional information such as timestamps and serial number can be included in the lock request. The requested lock mode is the type of access for the lock, such as a shared or exclusive lock, a lock for a read, a lock for a write, lock for exclusive write, lock for shared write. If the centralized lock server 550 grants the lock request, the lock server 550 then uses information provided in the lock request (e.g., the first handle) to retrieve the latest version of the requested file from cloud storage 560. The centralized lock server 550 transmits the latest version of the requested file to the lock daemon 516, which can store the file in local cache 540.

An unlock request can include the same or similar information as the lock request but with an updated handle name that was generated as a result of modifications to the locked file. A lock break request can be provided by a system administrator to manually unlock a file (e.g., if a user leaves a locked file open overnight, a server goes down, etc.).

Prior to making a new lock request, the lock daemon 516 determines whether a lock already exists in local cache 540 or on the centralized lock server 550. If no lock exists in either of those locations, the lock daemon 516 acquires a new lock through the centralized lock server 550. The new lock can have a lock mode computed using the requested access and share profiles (masks).

Lock peeking can be initiated every time a file is opened for a read. In lock peeking, the lock daemon 516 can query whether a lock exists on the file prior to opening the file. If a lock exists, the lock daemon 516 can also determine the associated lock mode to evaluate whether the lock mode permits the user to open the file. The lock daemon 516 retrieves this information from local lock cache 540 if the filer requesting the lock peek already has a write lock on the file. Otherwise, the lock daemon 516 retrieves this information from the centralized lock server 550. Each lock peek request can be cached in the local lock cache 540 for a short time period (e.g., several seconds) to reduce traffic to the central lock server 550 if the lock daemon 516 receives a new lock peek request shortly after the first lock peek request.

For example, another user may have a lock for exclusive write access to the file that does not allow any shared access (i.e., no shared read access). In this example, the lock daemon 516 determines from the lock query that the file cannot be opened due to an existing lock on the file. In another example, the lock mode can allow shared read or write access in which case the lock daemon 516 determines from the lock query that the file can be opened.

During lock peeking, the lock daemon 516 can also retrieve additional information about the file, such as the file handle, handle version, first handle, and lock push version. The file handle is a pointer to the latest version of the file in the cloud. The handle version is a version of the file in the cloud. The first handle provides a unique identifier to the file across versions and renames of the file. The lock push version is the latest version of the file that was sent to the cloud.

The lock deamon 516 can cache locks and unlocks in a local lock cache 540 for release to the centralized lock server 550. If a lock request is made for a file that has a cached unlock request, the lock can be reestablished without having to acquire a new lock from the centralized lock server 550. In such a situation, the unlock request is cancelled. This caching can reduce load on the lock server 550 and improve response time. In general, the unlock requests are cached for a certain period of time prior to release to the lock server 550 to allow for such lock reestablishment.

As discussed above, the lock request includes information on the protocol (e.g., SMB/CIFS or NFS) of the requester and the lock mode. The lock server 550 receives this information and can determine, based on any existing lock(s) on the requested file, whether the lock server 550 can issue multiple locks on the same file. The lock server 550 can evaluate the protocol used by the requester of the existing lock and the associated access/share permissions of that lock and determine whether protocol used with the new lock requester is compatible.

In addition, the lock daemon 516 handles lock releases. In some embodiments, the lock daemon 516 does not immediately send the lock release to the lock server 550. This time delay can reduce load on the centralized lock server 550 because files are frequently locked and unlocked in rapid succession, as discussed above. Before a lock is released, if the file was changed, the current data is sent to cloud storage 560 (e.g., Amazon S3, Microsoft Azure, or other public or private clouds) so the most recent data is available to the next locker.

Finally, the lock daemon 516 can communicate with the FSA 508. The lock daemon 516 can receive lock requests and/or lock peek requests from FSA 508, which the lock daemon 516 translates into a common protocol for transmission to the centralized lock server 550, as discussed above. The lock daemon can also pass the updated handle name to the FSA 508 to perform a file-level snapshot before unlocking a file and/or a file level merge/synchronization before locking a file.

For global locking, it is desirable for the locker to have the most recent version of the file associated with the lock request (and lock grant). To accomplish this, the cache manager 512 can be configured to snapshot a single file (e.g., the file associated with the lock request) without triggering a copy-on-write (COW) event (which would cause a version update, as discussed above) and without affecting other snapshot operations. After a single file snapshot, the cache manager 512 can mark all parent directories of the file as changed or "dirty." In addition, the fault manager algorithm can be configured to fault a single file based on requests from the FSA 508.

The merge/push algorithm can be modified to provide for merging single files. Before the locked file is pushed to the local cache 540, the NOC 555 assigns a unique lock version (e.g., 64 bit) to the file. The lock version can be used by FSA 508 to determine whether a locked file or its metadata is dirty (i.e., changed). The parent directories of the locked file can continue to use the existing write version assigned from the last TOC. Thus, FSA 508 can track two values: lock_write_version and lock_push_version. When a file or directory is dirtied, the lock_write_version is updated. When a file or directory is pushed to local cache 540, the lock_push_version is updated.

As discussed above, the file data from the NOC 555 (or centralized lock server 550) is merged into the local cache 540 before the FSA 508 returns control of the file to the client. To determine if the file data in the NOC 555 is newer than the file data in the cache 540 (e.g., if the lock is retrieved while an unlock request is cached), the FSA checks MAX (lock_write_version, lock_push_version) against the NOC lock version. If the NOC lock version is greater than the lock_write_version and the lock_push_version, the file data (object metadata and data) from the NOC 555 is used to instantiate the object (locked file) in the local cache 540. If the file data in the cache 540 is newer, then the file data from the NOC 555 is discarded. In the circumstance where the NOC 555 indicates that the file is deleted, the delete version is compared to the local cache 540 version in order to apply the delete to the local cache 540.

In addition, the merge/push algorithm can be modified to reconcile the single-file merges of locked files with the snapshot merges of files. Any file that was "fastsynched" through the FSA 508 (i.e., locked) or "fastpushed" to the cloud (i.e., unlocked) is designated as "cloud fastsynced." When merging an object or file that is considered "cloud dirty" or "cloud fastsynced," the FSA 508 will update the file if the incoming lock_push_version is greater than MAX (lock_write_version, lock_push_version), as discussed above. If the incoming lock_push_version is less than MAX (lock_write_version, lock_push_version), the cache object is considered newer and the incoming update is discarded by the FSA 508. Also, when a file is missing (deleted) from the pushed version but the file is also locally fastsynced, the file will not be deleted. This merging can occur concurrently or before the global lock on the file is granted.

In addition, if a file has been deleted or renamed, the local cache metadata can record a "delete tombstone" which includes certain information (e.g., parent first handle, lock version, name, etc.). FSA 508 merges a file as new if the file is newer than any delete tombstone contained in the cache for the unique file. This can address the situation in which a file has been fast synchronized before merge. In that case, the incoming cloud dirty file is old compared to the cache and the import is discarded.

To ensure that the unlocked file includes the changes from the latest version, the locked file can only be unlocked when the lock_push_version is greater than or equal to the lock_write_version at which point the FSA 508 sends the lock_push_version back to the NOC 555 (or centralized lock server 550) to store the new version of the file in cloud storage 560.

In some embodiments, the interface 510 snapshots and merges new files at the time of creation. The new file requests can be stored on the lock server 550 with the lock entries. Other users can poll the lock server 550 to determine if new files/objects exist that have not yet been populated to the cloud 560, for example if there are new files/objects in a given directory. After the new files have been created, the locker server 550 can merge the new file requests into the appropriate directories in the cloud 560.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise. This enables partners to share the filesystem (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

The above-described services platform consolidates an enterprise's Network Attached Storage (NAS) and file server silos in cloud storage, delivering infinite scale, built-in backup, global file sharing, and local file server performance. A commercial implementation of these technologies is a software-as-a-service (SaaS) platform is available from Nasuni Corporation. Enterprise customer data is stored on one or more third party clouds in a write-once, read-many (WORM) manner in a platform-specific format, namely, UniFS©-formatted volumes. This solution provides NAS consolidation, backup and recovery modernization, multi-site file sharing, and rapid, infrastructure-free disaster recovery, while also serving as a foundation for data analytics and multi-cloud IT initiatives in a manner that is now described.

Selectively Exporting Data to a Target Cloud Service

With the above as background, the techniques of this disclosure are now described. As will be appreciated, when an enterprise customer utilizes the above-described platform, typically the enterprise's files are de-duplicated, encrypted and obfuscated as they are stored as objects in one or more third party cloud storage. This is done to maximize security and reduce the amount of cloud storage needed to store file data. As such, the enterprise's data assets (whether structured, unstructured or semi-structured) are not readily accessible to be operated upon by various third party cloud native tools, such as business intelligence and analytics tools. To address this scenario, the technique of this disclosure provide a mechanism by which an enterprise can still extract value from its unstructured and semi-structured data assets using any third party cloud services. This mechanism is sometimes referred to herein as a "connector" or "data exporter," although this nomenclature should not be taken as limiting. The basic notion is that an enterprise user uses the mechanism to extract the files in at least a portion of a given global file system-formatted volume to a preferably unencrypted target location (e.g., an S3 bucket, an Azure storage account), such that a cloud-native service (external to the SaaS platform) can then carry out an operation on that extracted data set.

In one embodiment, the exporter executes in a server-less environment, although this is not a limitation. In this embodiment, and during the export operation, preferably file and directory permission information is not exported. Also, in this embodiment preferably the exporter operates in a read-only manner; in other words, the exporter only reads data from the global file system, and any writes back to the global file system then occur through the system's standard processes (also as described above).

Figure 6:
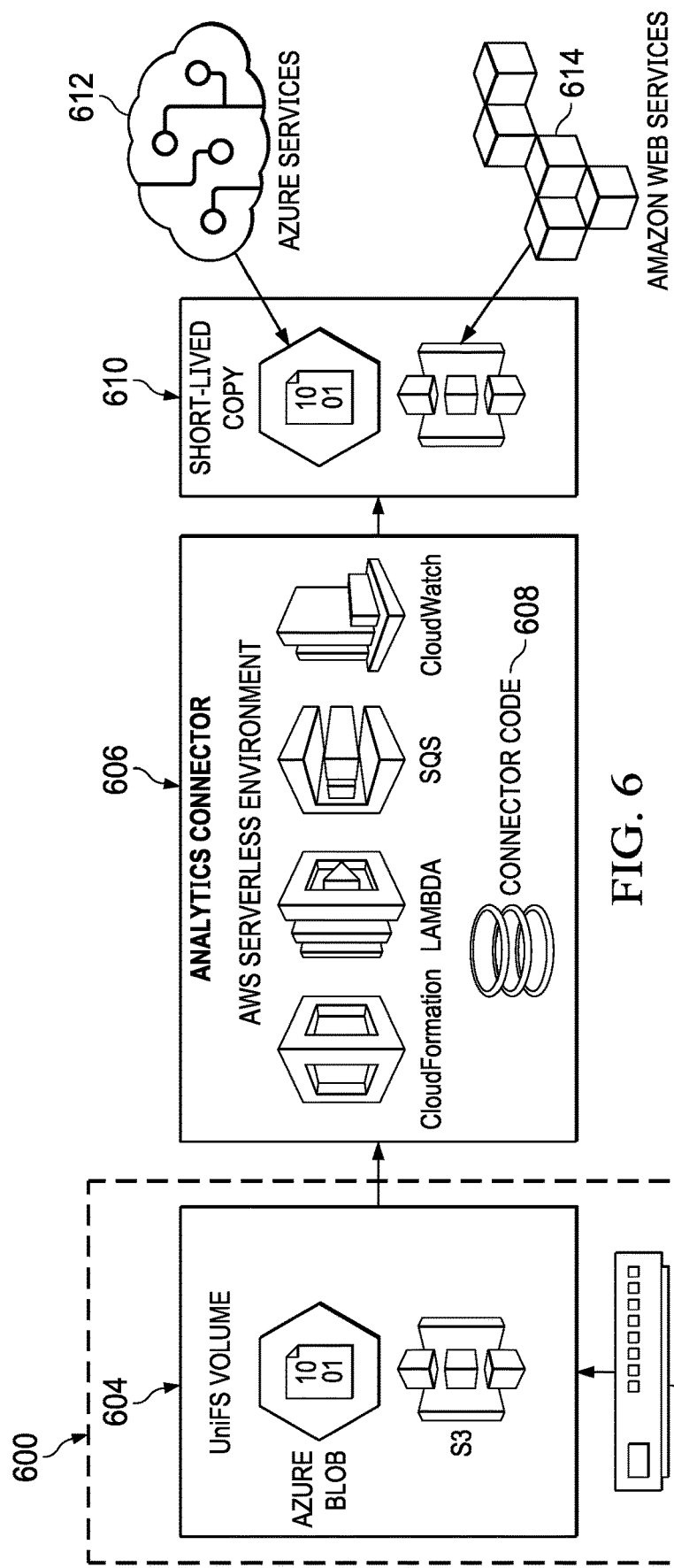
FIG. 6 depicts how the above-described global file system is augmented to include a file exporter that provides a mechanism to export a short-lived copy of given enterprise customer data stored in the global file system.

FIG. 6 depicts the basic operating environment. As described in FIGS. 1-5 above, the global file system 600 utilizes filer 602 to generate the versioned file system (e.g., Nasuni UniFS) volumes 604 that are stored as objects in one or more cloud storage, such as S3 or Azure. According to this disclosure, connector code 608 (the exporter) is hosted and executed in a server-less environment 606 (e.g., in AWS) and is configured to export to a separate cloud storage volume location a copy 610 of the enterprise's data in a native format. The copy is sometimes referred to herein as a short-term or temporary or transient copy. Although these definitions imply a limited or restricted temporal context, the length of time is variable and implementation-(or system- or user-) specific. Thus, the adjectives are not intended to require any particular temporal limitation or restriction.

The short-term copy 610 is then available to be processed by a cloud-native service, such as may be available to the enterprise. In this example, the copy 610 is then made available to a cloud service accessible from the Azure cloud 612, or from Amazon Web Service 614. These are merely example scenarios, as there is no restriction on the type of cloud service that may access and use the exported temporary copy. Utilizing the exporter in this manner, the cloud service can operate on the enterprise data (structured, unstructured, semi-structured) in that service's native format, in effect bypassing the obfuscation and encryption layers that were applied by the filer 602 when that data was processed into the versioned file system (VFS) volume in the first instance.

Detailed Design

The following describes a representative implementation, using AWS as an example. It is assumed that the filer 602 has generated a snapshot of a source volume that is located on an Amazon S3 bucket or Azure blob storage container. The target of the operation is an S3 bucket of Azure blob storage container, and in this embodiment the connector runs on AWS (as depicted in FIG. 6). Familiarity with AWS and Azure cloud services and operations is presumed in the following description.

The following discussion references AWS cloud services, but this is merely for exemplary purposes. Other cloud services have comparable functionality to that discussed below.

To initiate an operation, an enterprise customer (of the SaaS platform) needs their encryption keys, information available from the SaaS provider's Management Console (MC), and an AWS account. In this embodiment, the connector 608 is invoked by instantiating an AWS CloudFormation stack, which can be done through the AWS console, by scripting from the AWS command line, or by calling the AWS CloudFormation API directly. All necessary resources then are automatically created. An AWS CloudWatch Dashboard displays the progress and status of the operation. After the connector 608 has transformed and saved the data to the specified target, the data is available to cloud-based business intelligence and analytics services.

During a representative configuration operation, a setup wizard (e.g., a web-based configuration tool) is exposed to the enterprise user. Using the wizard, the connector is made visible to the AWS account. As noted, the enterprise must have the encryption key (and optionally a passphrase associated therewith) for the volume whose data is desired to be copied. Using the setup wizard for the connector, the authorized enterprise user securely stores the volume encryption key, e.g., in AWS Parameter Store. Security best-practices (e.g., using least-privilege credentials) preferably are enforced for this operation. If additional secret and access keys with more privileges are desired, the user may set up a new IAM (Identity and Access Management) user, e.g., with programmatic access only. The user also configures the connector to writes the file data (stored by the global file system in a third-party cloud storage) to a destination Amazon S3 bucket or Microsoft Azure Blob Storage container specified in the setup wizard. If the enterprise does not already have a bucket, or storage account and container, to use, the setup wizard may be used to enable the user to create one before running the connector. This function is not required, however. If the enterprise is using AWS as the destination cloud provider, and if the user needs to create the destination bucket, preferably default security settings that block all public access are configured. Preferably, the destination bucket is located in the same region as the source, because this reduces AWS transfer costs, but this is not required. A reason for choosing a different region than the source bucket would be if the business intelligence or analytics services that are desired to be used on the exported files are not available in the source bucket's region. If AWS is being used as the destination cloud provider, the setup wizard also prompts for an access and secret key, which allows the connector to write to this bucket. Alternatively, these fields can be left blank, in which case connector uses the privileges of the user account initiating the export. After this is done, the access and secret key are recorded for use in the setup wizard. In this example configuration setup, if the enterprise is using Azure as a destination cloud provider, and if the user needs to create the destination container, preferably default security settings that block all anonymous access are enabled. To help reduce latency and, potentially, cost, preferably the user creates the container in the same (or geographically close) region as the source and executing region. When using Azure as a destination cloud provider, the connector setup wizard prompts for a Blob service SAS URL, which allows the connector to write to the specified container. The SAS URL can be generated from the Azure portal, and it should be created with least privileges.

Figures 7, 8:
Figure 9:
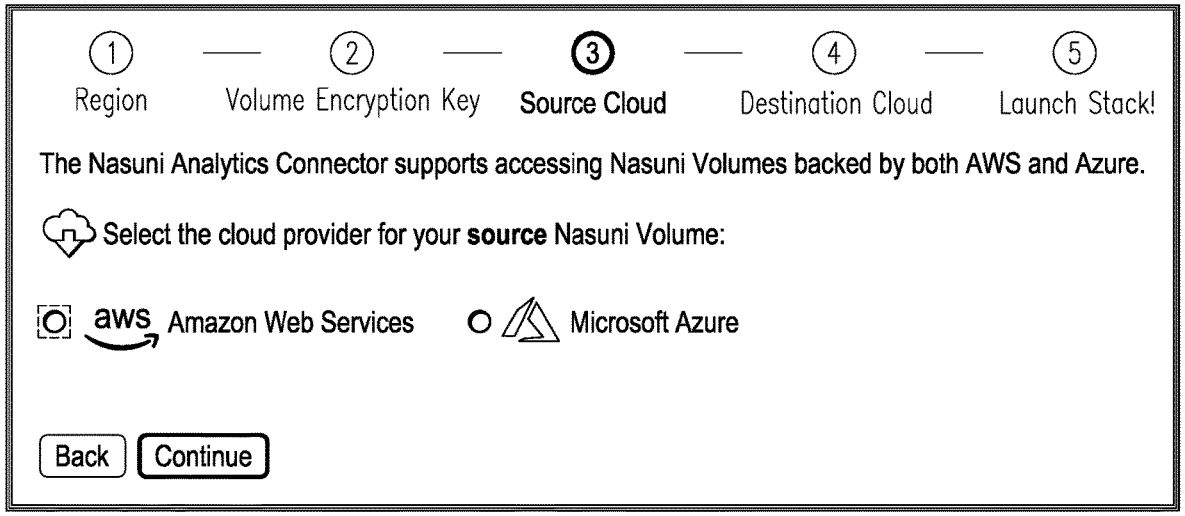
Figure 10:
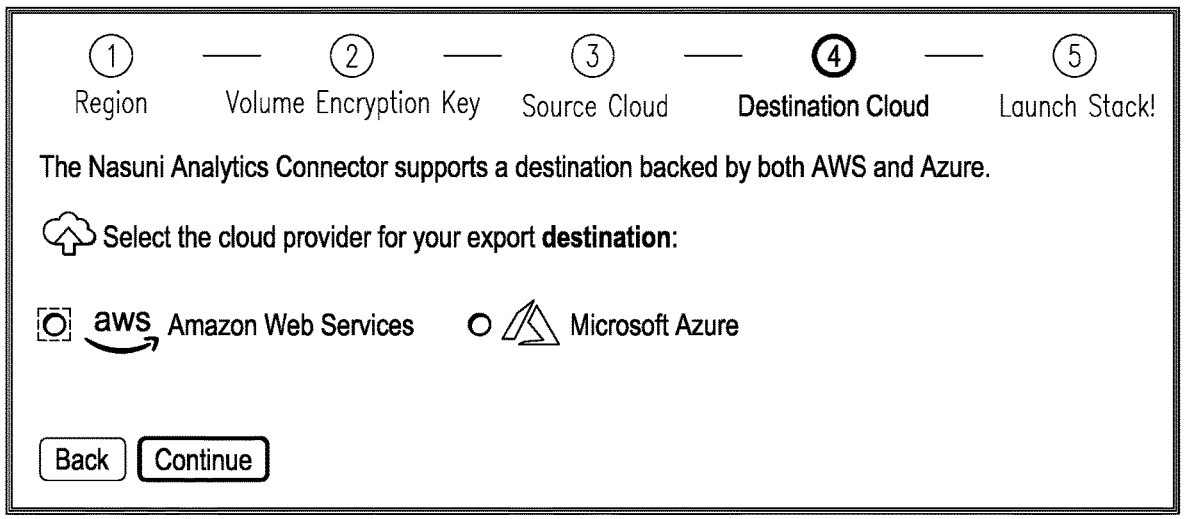
Figure 14:

FIGS. 7 through 14 depict representative user interfaces provided to facilitate the configuration of the connector. FIG. 7 depicts the initial screen view for the setup wizard. At a first step (the initial display), the user selects the AWS region where the connector is to run. This is the region where the code executes, and in which the supporting AWS resources are created. It is useful to consider AWS transfer costs at this point. If the source and destination S3 buckets are in the same region, the cheapest option is to choose the matching region in this step. If the source and destination S3 buckets are in different regions, the cheapest option is to choose the region of either the source or the destination buckets. Choosing any other region than that of the source or destination S3 buckets incurs additional and potentially needless cross-regional transfer costs. Additionally, if using Azure as a source, it recommended to choose an AWS region that is geographically close to the Azure storage container in order to limit the latency in the communications between AWS and Azure. In FIG. 8, and at step 2, the user is prompted for the AWS Access Key ID and the AWS Secret Access Key that allow write access to the AWS Parameter Store, and selects the file that contains the volume encryption key. In FIG. 9, and at step 3, the user chooses the cloud provider of the source volume. In FIG. 10, and at step 4, the user chooses the cloud provider for the export destination. As depicted in FIG. 11, the user is prompted to validate that all the provided information is correct, and then click "Launch Stack" to proceed with the execution of the connector. In response, the CloudFormation "Quick create stack" page (FIG. 12) in the AWS account appears. In the "Stack name" text box, the user enters a name for the AWS CloudFormation stack. In the "Connector License Key" text box, the user enters the license key for the connector. Using FIG. 13, the following information is then entered: Source S3 Bucket Name: when using AWS as the source cloud provider, the user is prompted for the name of the bucket containing the volume from which the connector obtains the data; Source S3 Bucket Access and Secret Key IDs: when using AWS as the source cloud provider, the user is prompted for the Access and Secret Keys to use when reading from the source bucket: Source Azure Container Name: when using Azure as the source cloud provider, the user is prompted for the name of the blob storage container hosting the volume from which the connector obtains the data; Source Azure Container—Blob service SAS URL: when using Azure as the source cloud provider, the user is prompted for a Blob service SAS URL with permissions to the source Azure blob container; Volume Encryption Key Parameter Name: the name of the parameter in the AWS Parameter Store that contains the volume encryption key for the source volume; Volume Encryption Key Passphrase: any applicable passphrase associated with the volume encryption key (if one has been configured); Snapshot Handle: the handle for the start of the snapshot of the source volume from which the connector obtains the data; Source Path: The starting directory within the source volume from which the connector obtains files; Include Filter Pattern: a pattern in glob, list of comma-separated globs, or regex format for which file names to export from the source volumes; Include Filter Type: from the drop-down list, indicate if an Include Filter Pattern is a glob, list of globs, or regex pattern; Exclude Filter Pattern: an optional pattern in glob, list of comma-separated globs, or regex format for which file names to exclude from the export; Exclude Filter Type: from the drop-down list, indicate if the Exclude Filter Pattern is a glob, list of globs, or regex pattern. Using FIG. 14, the user then enters information about the destination of the data: Destination S3 Bucket: when using AWS as the destination cloud, this is the S3 bucket that is the destination for the exported data; Destination S3 Bucket Access and Secret Key IDs: when using AWS as the destination, these are the access and secret keys to use when writing to the destination bucket; Destination Azure Container Name: when using Azure as the destination cloud provider, this is the name of the blob storage container that is the destination for the exported data; Destination Azure Container—Blob service SAS URL: when using Azure as the destination cloud provider, the user is prompted for a Blob service SAS URL with permissions to the destination Azure blob container; Destination Path: a path to prepend to the object keys created in the Destination S3 Bucket. This is useful to export files into a "subdirectory" in the destination bucket. Although not required, when performing the connector exports, AWS IAM entities are automatically created and granted permissions to access necessary AWS resources in the enterprise account.

Figure 15:
Figure 16:
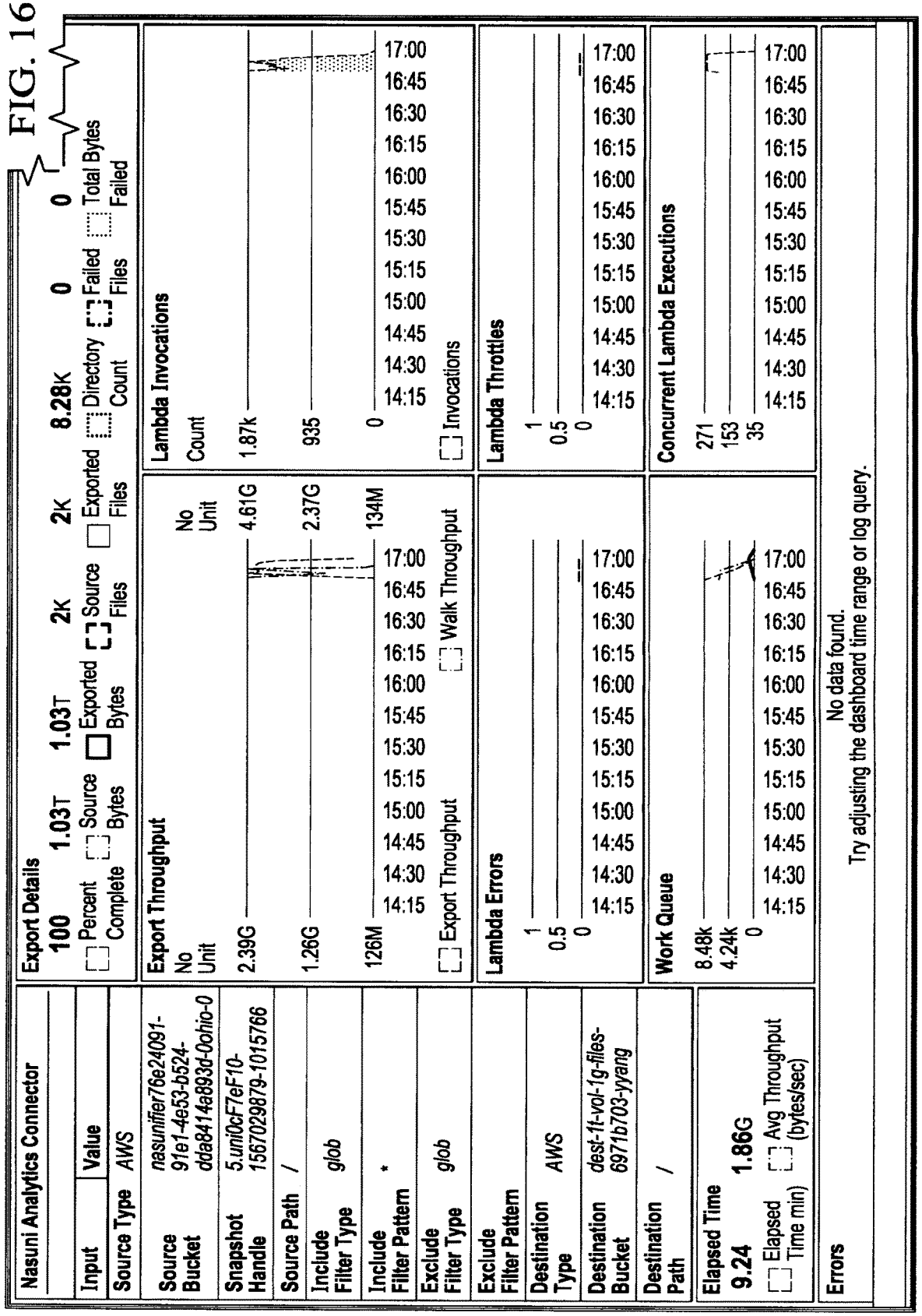

Once configured as described above, the connector is then used to extract the temporary copy to the target destination. Typically, the connector operates on a snapshot, and a snapshot handle represents a point-in-time when a snapshot was completed. In this example embodiment, the connector is implemented using AWS server-less services initiated by a CloudFormation template. The CloudFormation stack creation is initiated and, as the necessary AWS resources are created, CloudFormation logs events in the UI (not shown). After stack creation finishes, the actual export process begins. As depicted in FIG. 15, the connector provides a dashboard to monitor the progress of the export. To access this dashboard, the user clicks an Outputs tab for the CloudFormation stack. In the list of Outputs, the user click a DashboardURL output key. This opens the CloudWatch Dashboard as shown in FIG. 16. In a representative embodiment, several metrics are rendered. The first is Source Bytes. In operation, and as will be describe further below, the connector traverses the UniFS filesystem, looking for items that match the export criteria and adds these items to a work queue. The Source Bytes metric is a running total of the file sizes that are exported. This metric increases as the connector discovers more files that need to be exported. The next metric is Exported Bytes. At the same time that the connector is traversing the UniFS filesystem, it is also exporting files to the destination bucket. The Exported Bytes metric is a running total of the sizes of all the files that have actually been written to the destination. This metric trails the Source Bytes metric, because the traversal starts first. Another metric is Percent Complete. This metric is based on the ratio of Exported Bytes and Source Bytes. After all files have been exported, Exported Bytes and Source Bytes are equal, and this metric shows 100%. Other metrics include Source Files, Exported Files, and Elapsed Time. Source Files are the number of files that the connector has found in the source bucket that match the criteria to export. Exported Files are the number of files that the connector has exported to the destination. Elapsed Time is the export has taken, starting from when the CloudFormation stack finished creating to when the Percent Complete reaches 100%.

As noted above, preferably the exporter is packaged and delivered as a server-less application, e.g., via AWS Lambda, as an Azure Function, but other options (e.g., a virtual machine (VM)) may be used. Generalizing the above, the following information is needed to configure the application prior to running includes: source object store access keys (e.g., AWS access and secret, ideally with read-only permissions), target object storage access keys (with write access permissions), operational access keys that allow the code to communicate as needed with additional cloud resources, a handle in the source object store indicating which snapshot to extract, filesystem path to start the extraction (e.g., a root, a subdirectory, etc.), decryption keys for the volume (or some reference to the decryption keys in a key management service), encryption keys for the exported files (if the output itself from the connector is to be encrypted). In order to scale to accommodate any size filesystem (wide or deep), preferably each instantiation of the server-less code extracts a single directory without itself traversing into any subdirectories. Instead, and for any subdirectory, instead the application code spawns a new instantiation to handle that subdirectory (or puts a work item on a queue for a separate such instantiation to process). Yet another alternative is that an instantiation spawns one or more additional instantiations, which break up the work of extracting the single directory. As noted, data is extracted into a native object format, and authentication and security of the data is maintained when migrated to the object format. The functionality of the exporter stops after the export is complete. By providing a means to export a short-lived copy of the customer data into an object store, the cloud-native tool then operates directly against the object store as opposed to through the filer itself. In one embodiment, file and directory permission information is not exported.

The exporter tool may have an associated cost estimator that provides the user with information about the cost of creating the copy (e.g., transfer cost), as well as the cost for the server-less execution. The estimator may include the capability to learn heuristics (e.g., based on volume/snapshot size and file/directory layout), which enables the estimator to provide accurate predictions of the cost of running an anticipated export.

In a variant scenario, the exporter receives (as input) an output of a search engine query, thereby enabling the connector to export data and/or metadata (the response to the query) back to the search engine.

The above-described exporter provides many benefits, such as:

Flexibility: The connector reads global file system (e.g., UniFS®)-formatted volumes hosted, e.g., on Amazon Simple Storage Service (Amazon S3) and Microsoft Azure Blob Storage, and writes files in native object format to target accounts, e.g., Amazon S3 or Azure storage accounts.

Speed: Because the connector works directly on file data already in cloud storage, the process is scalable and fast, capable of exporting 14-16 TBs of data per hour.

Control: Customers are able to specify file types, specific paths, and more, to refine the selection of data for analysis.

Secure: In one preferred approach, the connector runs entirely in the customer's AWS account, using customer keys stored securely in AWS Parameter Store.

Predictable Costs: A cost estimator tool is provided to help customers project the cloud provider costs associated with running the connector.

The connector enables an enterprise to leverage their existing cloud services tools for applications such as the following:

Compliance: Compliance officers tasked with CCPA/GDPR governance can use a service such as Amazon Macie—which uses machine learning to automatically discover, classify, and protect sensitive data—to identify Personally Identifiable Information (PII) and Intellectual Property (IP) in their existing file data stored by the global file system provider in cloud storage. Understanding whether existing files contain protected data enables companies to address compliance issues quickly and systematically.

Search: Media indexing and search services can analyze files exported by the connector, and automatically identify objects, people, text, scenes, and activities in images and video. Content managers can search on the people, locations, and other information in their files.

Analytics: Using data subsets prepared by the connector, query services such as Amazon Athena and Azure Data Lake can analyze data in object stores using standard SQL, without first loading the data into a database. Business analysts can run queries against semi-structured (CSV, IoT) data stored in cloud storage by the global file system provider.

The above-described operation may have several variants. One variant provides the ability to synchronize a later snapshot over an existing exported snapshot; in this case the exporter may be configured to export just the deltas. Another variant provides the ability of the user to export a "live" version of their filesystem, such that any update to the VFS causes the corresponding update to the exported view. As described above, typically the enterprise itself manages the export of its data, i.e., without the SaaS provider's involvement. This is not a limitation. In another variant, and on behalf of the enterprise, the SaaS provider itself initiates an export via an API or UI; thus, the export itself may be provided "as-a-service."

There is no requirement that the exporter be run in the public clouds (AWS, Azure) identified above.

The above-described data exporter technologies may be leveraged and used in other contexts where it may be desired to selectively enable access (by a cloud service) to an enterprise's files that are stored as encrypted and obfuscated objects in cloud storage.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described the subject matter herein, what we claim is as follows.

The invention claimed is:

1. A method to selectively access enterprise data files, the data files having been processed into a versioned file system as encrypted objects in a cloud storage, comprising:
configuring a connector tool to export a given portion of the versioned file system, the connector tool configured with information identifying a first provider hosting the versioned file system, a first provider access key with an associated read permission, a second provider providing a target destination for an export of the versioned file system, a second provider access key with an associated write permission, and a file system path to the given portion; and
responsive to receipt of an export command, automatically extracting a copy of the given portion to the target destination in a native object format distinct from the versioned file system and compatible with a cloud-native service associated with the target destination, the versioned file system being incompatible with the cloud-native service.

2. The method as described in claim 1 wherein the connector tool is configured as a server-less application comprising multiple code instantiations.

3. The method as described in claim 2 wherein automatically extracting a copy of the given portion comprises, with respect to a directory in the given portion having one or more subdirectories and identified by the file system path, and using a first code instantiation, extracting just the directory and without traversing any of the subdirectories in the directory, and using a second code instantiation, extracting at least one subdirectory of the directory extracted by the first code instantiation.

4. The method as described in claim 3, further including the first code instantiation spawning the second code instantiation to process the at least one subdirectory in the directory.

5. The method as described in claim 1, wherein the export command is associated with receipt of a search query input.

6. The method as described in claim 5, further including receiving a result from the cloud-native service, the result having been generated at least in part using the extracted copy of the given portion.

7. The method as described in claim 6, further including returning the result in response to the search query input.

* * * * *